(12) United States Patent
Breed

(10) Patent No.: US 12,478,811 B1
(45) Date of Patent: Nov. 25, 2025

(54) THERMISTOR FOR WINDSHIELD SPRAYER CIRCUIT

(71) Applicant: Clifford B. Breed, Fort Worth, TX (US)

(72) Inventor: Clifford B. Breed, Fort Worth, TX (US)

(*) Notice: Subject to any disclaimer, the term of this patent is extended or adjusted under 35 U.S.C. 154(b) by 427 days.

(21) Appl. No.: 18/097,271

(22) Filed: Jan. 15, 2023

(51) Int. Cl.
*A62C 2/00* (2006.01)
*A62C 3/02* (2006.01)

(52) U.S. Cl.
CPC . *A62C 2/00* (2013.01); *A62C 3/02* (2013.01)

(58) Field of Classification Search
CPC .................................. A62C 2/00; A62C 3/02
See application file for complete search history.

(56) References Cited

U.S. PATENT DOCUMENTS

| | | | | |
|---|---|---|---|---|
| 3,782,634 A * | 1/1974 | Herman | ............... | E01H 10/007 239/524 |
| 4,093,107 A * | 6/1978 | Allman | ............... | A01M 7/0089 222/614 |
| 4,203,423 A * | 5/1980 | Ricci | ............... | B60B 39/028 126/271.1 |
| 5,350,035 A * | 9/1994 | Bodier | ............... | B60B 39/10 291/1 |
| 6,237,861 B1 * | 5/2001 | Northrop | ............... | B60S 1/603 239/284.1 |
| 6,414,832 B1 | 7/2002 | Crecelius et al. | | |
| 6,538,235 B2 * | 3/2003 | Lopez | ............... | B60S 1/023 219/202 |
| 6,966,498 B2 | 11/2005 | Huang et al. | | |
| 7,111,631 B1 * | 9/2006 | Breeze | ............... | B60S 1/66 134/123 |
| 8,431,868 B1 * | 4/2013 | Akin | ............... | B60L 1/02 219/202 |
| 8,925,834 B2 | 1/2015 | Jeuffe et al. | | |
| 9,181,916 B2 | 11/2015 | Wijaya et al. | | |
| 10,080,257 B2 | 9/2018 | Salter et al. | | |
| 10,442,410 B1 * | 10/2019 | Santillan | ............... | B60S 1/487 |
| 10,444,048 B2 | 10/2019 | Humpal et al. | | |
| 2002/0088625 A1 * | 7/2002 | Brennan | ............... | A62C 3/07 169/62 |
| 2002/0141874 A1 * | 10/2002 | Schoenmeyr | ............... | F04B 49/022 417/44.11 |

(Continued)

*Primary Examiner* — J. Todd Newton
(74) *Attorney, Agent, or Firm* — Cramer Patent & Design; Aaron R. Cramer

(57) ABSTRACT

A Thermistor for Windshield Sprayer Circuit is a modification to a motor vehicle spray circuit that prevents utilization of the circuit in freezing temperatures. The device utilizes a thermistor that is connected between the main positive voltage, typically +12 VDC in a motor vehicle, and bias resistors that drive a transistor. When temperatures are high enough, envisioned to be above forty degrees Fahrenheit (40° F.), the thermistor presents an open circuit that does not interfere with the operation of the circuit. When temperatures are low enough, envisioned to be below forty degrees Fahrenheit (40° F.), the thermistor presents a closed circuit that does not allow the circuit, as well as the washer pump, to operate. The device would be used on an emergency vehicle equipped with an underbody spray system that uses the windshield system to spray dry vegetation under the vehicle to prevent fires.

2 Claims, 4 Drawing Sheets

(56) References Cited

U.S. PATENT DOCUMENTS

| | | | |
|---|---|---|---|
| 2004/0118939 A1* | 6/2004 | Shank | B60S 1/487 239/284.1 |
| 2004/0144107 A1 | 7/2004 | Breton et al. | |
| 2009/0304450 A1* | 12/2009 | Lewis | A01C 21/007 47/58.1 SC |
| 2021/0039784 A1* | 2/2021 | Wu | B64D 1/18 |
| 2022/0412553 A1* | 12/2022 | Haddad | A62C 3/0292 |

* cited by examiner

THERMISTOR FOR WINDSHIELD SPRAYER CIRCUIT

RELATED APPLICATIONS

Non-applicable.

FIELD OF THE INVENTION

The present invention relates to a thermistor for a windshield sprayer circuit and more specifically to a thermistor for a windshield sprayer circuit secured under a motor vehicle.

BACKGROUND OF THE INVENTION

It is often necessary to control operation of an electrical device and/or an associated mechanical device based on temperature. While some instances are just based on simple needs due to necessary outputs, others are of a more dire nature and affect safety of nearby people. One specific instance is that of a vehicle sprayer circuit that wets down dry vegetation under a motor vehicle to prevent fires. Such systems may be installed on emergency vehicles that have no choice to travel on dry vegetation under emergency conditions.

However, should the system be operated, either accidentally or intentionally, under freezing temperatures on a roadway, the liquid will almost instantly freeze, presenting a dangerous sheet of ice for following drivers. Accordingly, there exists a need for a means by which operation of a spray circuit in freezing conditions can be disabled. The development of the thermistor for a windshield sprayer circuit fulfills this need.

SUMMARY OF THE INVENTION

To achieve the above and other objectives, the present invention provides for a vegetation spray device has a wetting liquid sprayed on a plurality of vegetation entangled within an undercarriage of a motor vehicle to prevent ignition of the vegetation from a plurality of hot exhaust system components, a reservoir disposed on the motor vehicle, the reservoir contains the wetting liquid, a plurality of tubing carrying the wetting liquid from the reservoir to a spray pump which pressurizes the wetting liquid, and a control circuit controlling the spray pump.

The hot exhaust system components may not include a catalytic converter, a plurality of exhaust piping, and a muffler. The catalytic converter, the exhaust piping, and the muffler may become hot during operation to the point of causing ignition of combustible vegetation during prolonged physical contact. A plurality of spray patterns may be disposed on the undercarriage of the motor vehicle towards the undercarriage. The spray patterns may include the wetting liquid so that the vegetation is less likely to ignite.

The wetting liquid may be water. The motor vehicle may be selected from the group consisting of a passenger sedan, an SUV, a pickup truck, an off-road vehicle, an agricultural vehicle, or a construction vehicle. The reservoir may include a fill cap to refill the wetting liquid when depleted. The wetting liquid may be pressurized to a pressure above atmospheric pressure. The tubing may carry the wetting liquid to a plurality of spray nozzles that are interconnected by the tubing.

The control circuit may include a control switch that provides an interconnection to a spray pump motor as part of the spray pump. A potential applied to the spray pump motor may also supplied to a subcircuit having a first diode, a first resistor, a capacitor, a second resistor, and a variable resistor. The variable resistor may feed a first transistor as biased by a third resistor. Output from the first transistor is then used to drive a second transistor through a fourth resistor. The second transistor may provide a positive connection through a fifth resistor.

A temperature thyristor may be wired in parallel with the fifth resistor. An exterior temperature at the undercarriage may be below a predetermined temperature rating of the temperature thyristor, the control circuit will become non-operational and prevent energization of the spray pump motor. The predetermined temperature rating of the temperature thyristor may be 40° F. The transistor may drive a third transistor via a sixth resistor and a seventh resistor. The third transistor may drive a relay coil wired in parallel with a second diode.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
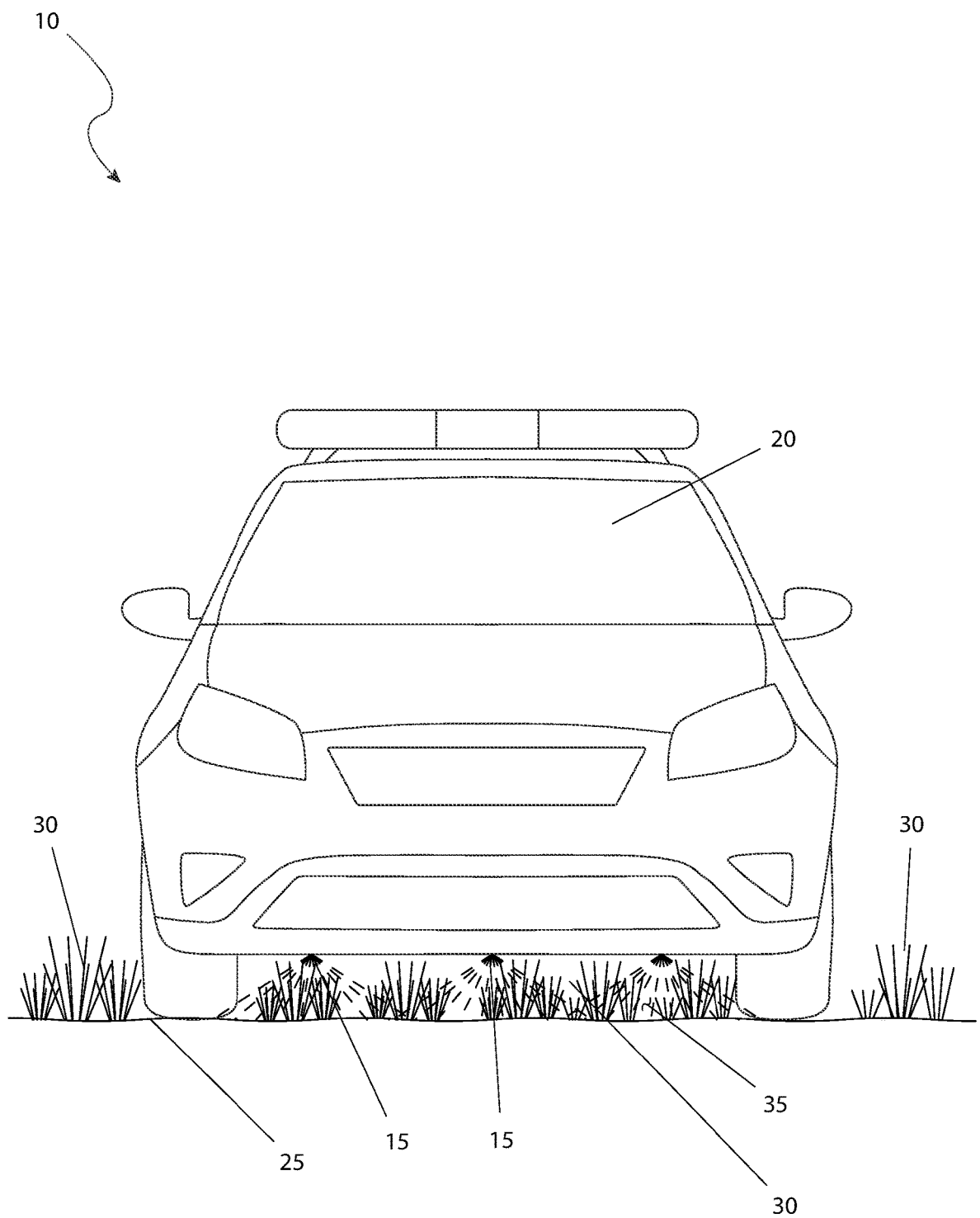
FIG. 1 is a front view of a vegetation spray device, according to the preferred embodiment of the present invention.

DESCRIPTIVE KEY 10 vegetation spray device
15 spray pattern
20 motor vehicle
25 grade
30 vegetation
35 wetting liquid
40 spray nozzle
45 undercarriage features
50 catalytic converter
55 exhaust piping
60 muffler
65 tubing
70 reservoir
75 fill cap
80 spray pump
85 electrical signal
90 control circuit
95 positive connection
100 negative connection
105 control switch
110 spray pump motor
115 first diode
120 first resistor
125 capacitor
130 second resistor
135 variable resistor 140 first transistor
145 third resistor
150 second transistor
155 fourth resistor
160 fifth resistor
165 temperature thyristor
170 third transistor
175 sixth resistor
180 seventh resistor
185 relay coil
190 second diode

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of a vegetation spray device 10, according to the preferred embodiment of the present invention is disclosed. The vegetation spray device (herein also described as the "device") 10, provides for the spraying of a wetting liquid 35 on vegetation 30 entangled within undercarriage features 45 of a motor vehicle 20 to prevent ignition of said vegetation 30 from hot exhaust system components, such as a catalytic converter 50, exhaust piping 55, or a muffler 60. The device 10 provides for multiple spray patterns 15 on the underside of a motor vehicle 20 towards the undercarriage features 45. The motor vehicle 20 is shown located on grade 25 with combustible vegetation 30, such as high vegetation, dry vegetation, fallen and dried leaves or the like. Such vegetation 30 is known to ignite when hot exhaust components of an internal combustion motor vehicle 20 remain in relatively stationary contact. The motor vehicle 20, as depicted in FIG. 1, is that of an emergency vehicle in that emergency vehicles are often found full of vegetation 30 during normal activity. However, the device 10 may be installed on any type of motor vehicle 20, including, but not limited to: passenger sedans, SUV's, pickup trucks, off-road vehicles, agricultural vehicles, construction vehicles, and the like. As such, the use of the device 10 on any particular type of motor vehicle 20 is not intended to be a limiting factor of the present invention. The spray patterns 15 are comprised of a wetting liquid 35, such as water, so that the vegetation 30 is less likely to ignite. Finally, the quantity and location of the spray patterns 15 is not intended to be a limiting factor of the present invention.

Figure 2:
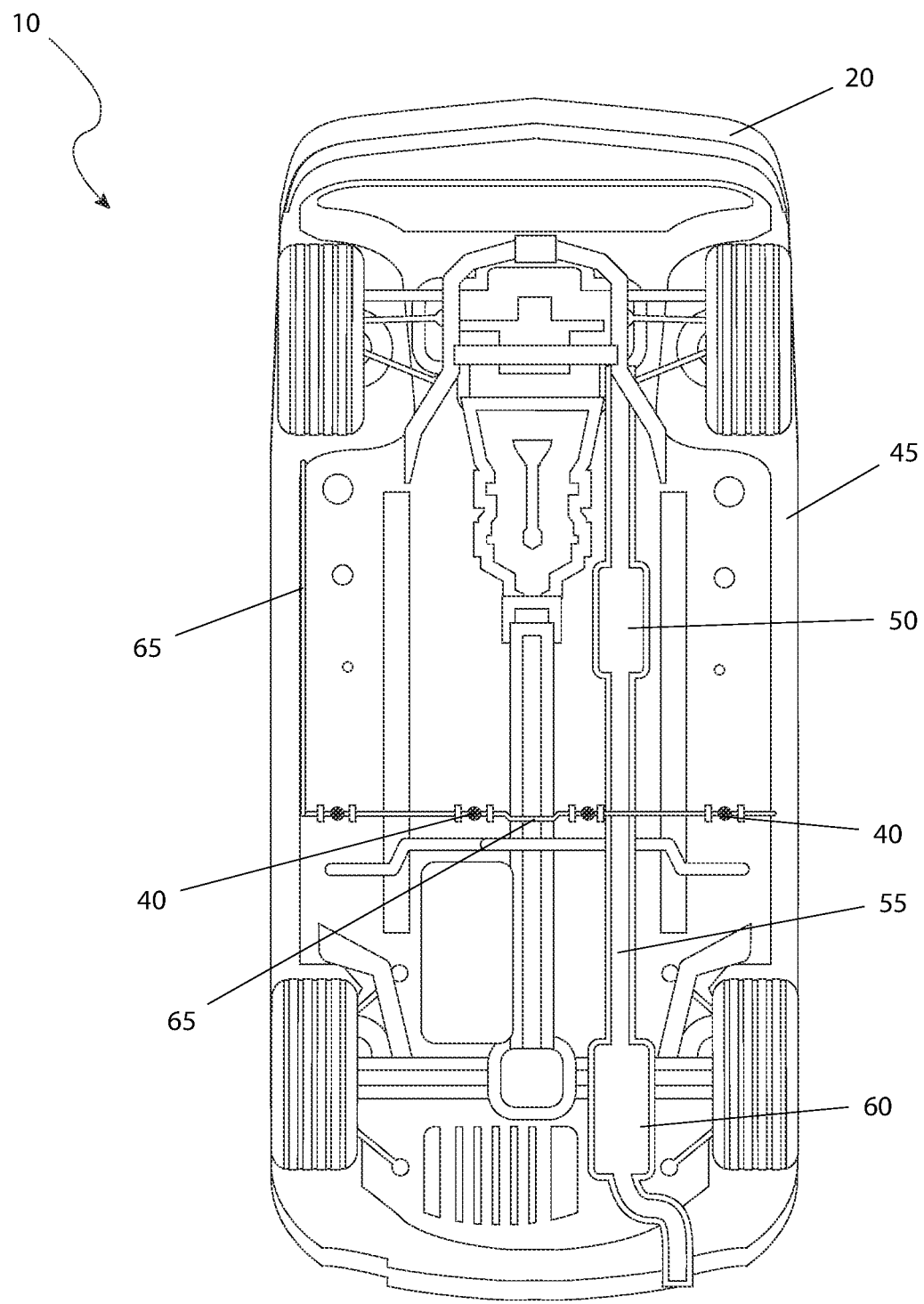
FIG. 2 is a bottom view of the vegetation spray device, according to the preferred embodiment of the present invention.

Referring next to FIG. 2, a bottom view of the device 10, according to the preferred embodiment of the present invention is depicted. The device 10 includes multiple undercarriage features 45, herein shown as a quantity of three (3) which produce the spray patterns 15 (as shown in FIG. 1). The undercarriage features 45 may include a catalytic converter 50, exhaust piping 55, and a muffler 60, herein shown in a representative configuration for purposes of illustration. The catalytic converter 50, the exhaust piping 55, and the muffler 60 are the expected components of the motor vehicle 20 that become hot during operation to the point of causing ignition of combustible vegetation 30 during prolonged physical contact. The application of the wetting liquid 35 (as shown in FIG. 1) is envisioned to prevent such ignition. The spray nozzles 40 are interconnected by tubing 65. Further description and usage of the tubing 65 will be provided herein below.

Figure 3:
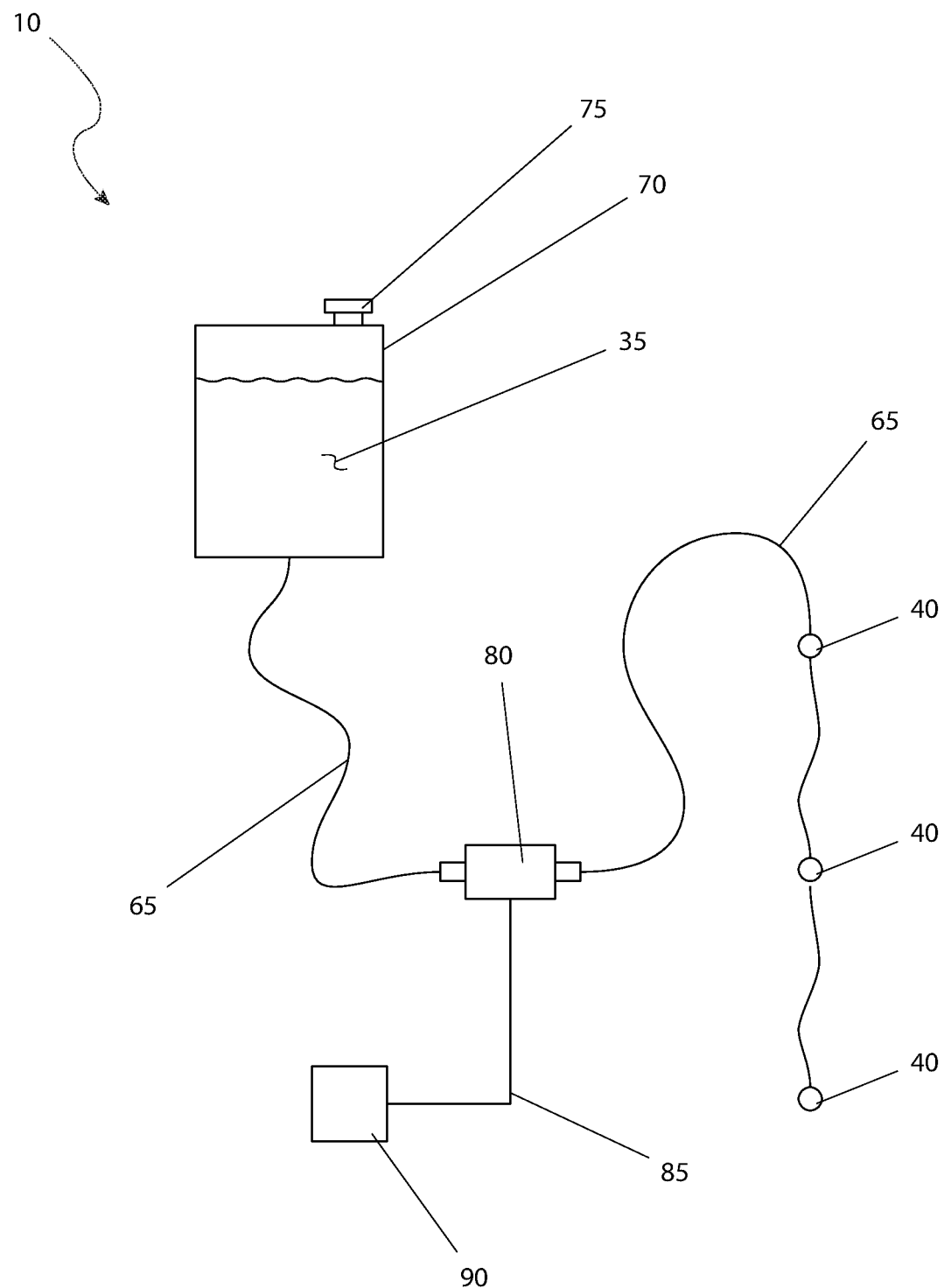
FIG. 3 is a mechanical diagram of the vegetation spray device, according to the preferred embodiment of the present invention.

Referring now to FIG. 3, a mechanical diagram of the device means 10, according to the preferred embodiment of the present invention is shown. The wetting liquid 35 is contained within a reservoir 70 located on the motor vehicle 20 (as shown in FIG. 1). The reservoir 70 is provided with a fill cap 75 to refill the wetting liquid 35 when depleted. A section of tubing 65 carries the wetting liquid 35 from the reservoir 70 to a spray pump 80 which pressurizes the wetting liquid 35 to a pressure above atmospheric. Tubing 65 then carries the wetting liquid 35 to the multiple spray nozzles 40 as shown. Operation and energization of the spray pump 80 is controlled via an electrical signal 85 from a control circuit 90. Further description of the control circuit 90 will be provided herein below.

Figure 4:
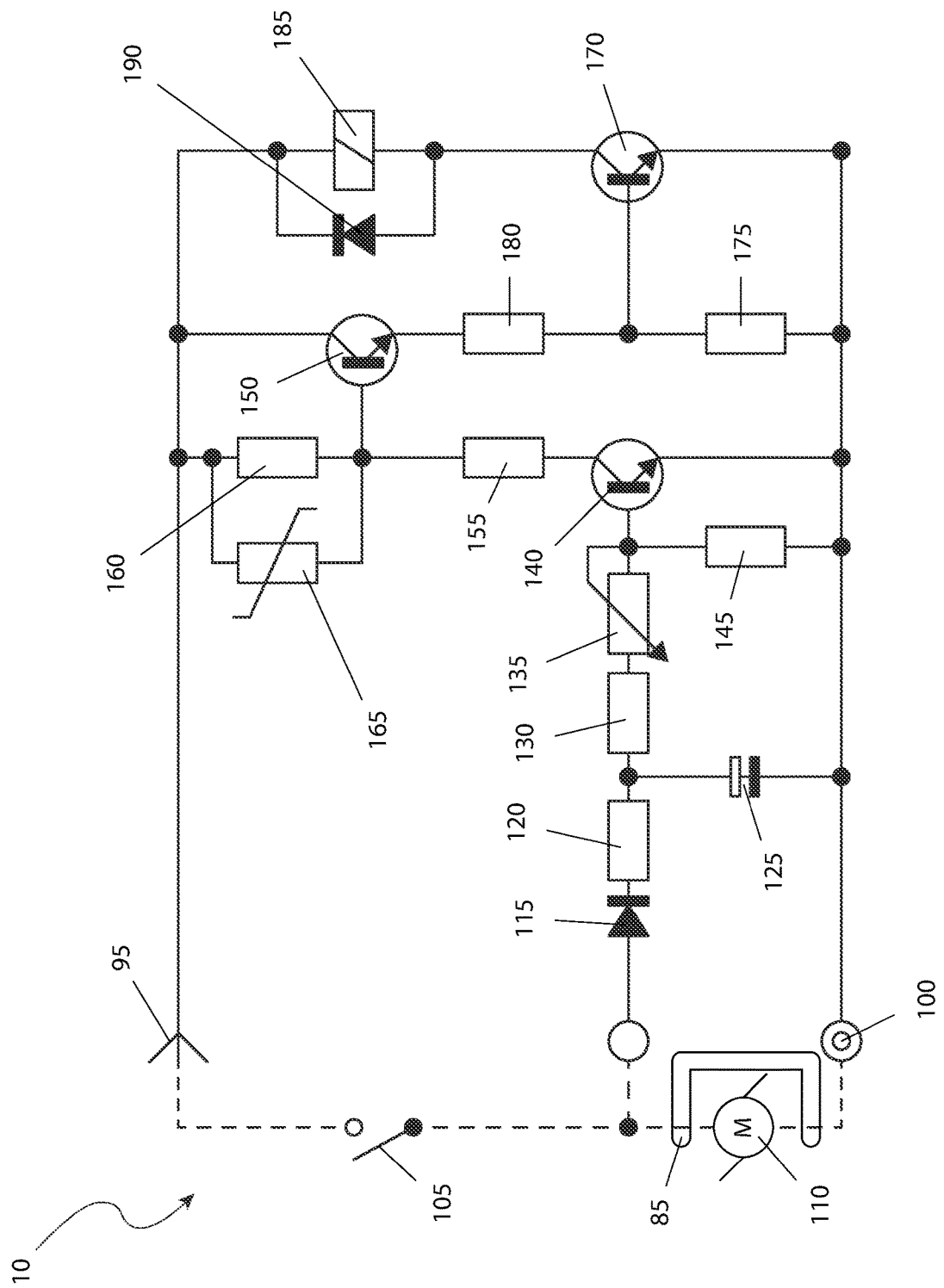
FIG. 4 is an electrical schematic of the vegetation spray device, according to the preferred embodiment of the present invention.

Referring to FIG. 4, an electrical schematic of the device 10, according to the preferred embodiment of the present invention is disclosed. A positive connection 95 and a negative connection 100 from the electrical system of the motor vehicle 20 (as shown in FIG. 1) is provided. It is envisioned that such a system would be twelve volts direct current (12-VDC), however other voltages such as twenty-four volts direct current (24-VDC) may also be utilized and as such, should not be a limiting factor of the present invention. A control switch 105 provides an interconnection to a spray pump motor 110 as provided as part of the spray pump 80 (as shown in FIG. 3) via the electrical signal 85. The same potential applied to the spray pump motor 110 is also supplied to a subcircuit consisting of a first diode 115, a first resistor 120, a capacitor 125, a second resistor 130, variable resistor 135 which feeds a first transistor 140 as biased by a third resistor 145. Output from the first transistor 140 is then used to drive a second transistor 150 through a fourth resistor 155. Said input signal for the second transistor 150 is referenced to the positive connection 95 through a fifth resistor 160. A temperature thyristor 165 is wired in parallel with the fifth resistor 160. Should the exterior temperature at the under carriage 45 (as shown in FIG. 2) be below a certain predetermined temperature rating of the temperature thyristor 165 (envisioned to be approximately forty degrees Fahrenheit (40° F.), the circuit will become non-operational and prevent energization of the spray pump motor 110. The output of the second transistor 150 drives a third transistor 170 via a sixth resistor 175 and a seventh resistor 180. Finally, the third transistor 170 drives a relay coil 185 wired in parallel with a second diode 190.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. It is envisioned that the device 10 would be provided as standard or optional equipment on new motor vehicle 20, direct from the motor vehicle manufacturer. It is also envisioned that the device 10 would be made available as an add-on kit for an existing motor vehicle 20 from conventional procurement channels such as automotive stores, mechanical supply houses, mail order and internet supply houses and the like.

After procurement and prior to utilization of the aftermarket version, the device 10 would be installed in the following manner: the reservoir 70 would be placed in an acceptable location on the motor vehicle 20; the spray nozzles 40 would be placed on the undercarriage features 45 in an acceptable and secure location so as to ensure spray patterns 15 are directed towards the desired areas where vegetation 30 has accrued; the spray pump 80 would be mechanically and electrically installed; a positive connection 95 and a negative connection 100 would be made to the control circuit 90; tubing 65 would be routed from reservoir 70 to the spray pump 80 and from the spray pump 80 to the multiple spray nozzles 40; and, the reservoir 70 would be filled with an appropriate wetting liquid 35. At this point in time the device 10 is ready for utilization.

During utilization of the device 10, upon driving the motor vehicle 20 over vegetation 30, the driver would activate the control switch 105, thus enabling the control switch 105 to energize the spray pump motor 110, provided the exterior temperature is above freezing as determined by the temperature thyristor 165. Multiple spray patterns 15 of the wetting liquid 35 would wet down any vegetation 30 near high temperature components such as the catalytic converter 50, the exhaust piping 55, and the muffler 60, thus preventing fires.

The device 10 is capable of repeated operation. Should the reservoir 70 become depleted, it may be refilled with additional wetting liquid 35 via the fill cap 75 as needed thus allowing for continuous operation in a repeating and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vegetation spray device comprising:
   a reservoir configured to contain a wetting liquid;
   a spray pump having a spray pump motor; tubing fluidly coupling the reservoir to the spray pump and from the spray pump toward at least one spray nozzle; and,
   a control circuit configured to selectively energize the spray pump motor, the control circuit comprising: a positive connection and a negative connection adapted to be coupled to an electrical system of a motor vehicle; a control switch providing an interconnection to the spray pump motor; and a subcircuit that receives a same potential as applied to the spray pump motor, the subcircuit comprising:
   a first diode and a first resistor coupled to define a node;
      a capacitor connected between the node and the negative connection;
   a second resistor connected between the node and the negative connection; a variable resistor coupling the node to a control input of a first transistor, the control input of the first transistor being biased by a third resistor;
   an output of the first transistor coupled through a fourth resistor to a control input of a second transistor; the control input of the second transistor connected to the positive connection through a fifth resistor;
   a temperature thyristor wired in parallel with the fifth resistor; an output of the second transistor coupled through a sixth resistor and a seventh resistor to a control input of a third transistor; and,
   a relay coil driven by the third transistor and wired in parallel with a second diode; and,
   wherein the relay coil controls application of electrical power to the spray pump motor;
   wherein, when an exterior temperature at an undercarriage of the motor vehicle is below a predetermined temperature rating of the temperature thyristor, the control circuit becomes non-operational to prevent energization of the spray pump motor;
   wherein the spray pump is configured to pressurize the wetting liquid to a pressure above atmospheric; and,
   wherein the tubing comprises a first section between the reservoir and the spray pump and a second section between the spray pump and the at least one spray nozzle.

2. The vegetation spray device of claim 1, wherein the electrical system is a direct-current system selected from twelve volts direct current and twenty-four volts direct current;
   wherein the reservoir is located on the motor vehicle and includes a fill cap to refill the wetting liquid when depleted;
   wherein the at least one spray nozzle comprises a plurality of spray nozzles that are interconnected by the tubing;
   wherein the wetting liquid is water; and wherein, when installed on the motor vehicle, the device is configured to wet vegetation entangled within undercarriage features of the motor vehicle proximate to high-temperature exhaust components including a catalytic converter, exhaust piping, and a muffler, and wherein the predetermined temperature rating is approximately forty degrees Fahrenheit.

\* \* \* \* \*